(12) United States Patent
Choate et al.

(10) Patent No.: US 11,365,815 B2
(45) Date of Patent: Jun. 21, 2022

(54) SYSTEM AND METHOD FOR CONVERTIBLE BALANCED AND UNBALANCED STEM VALVE

(71) Applicant: Baker Hughes Oilfield Operations LLC, Houston, TX (US)

(72) Inventors: Jeremy Ryan Choate, Houston, TX (US); Keith M Adams, Katy, TX (US); Travis Kyle McEvoy, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 362 days.

(21) Appl. No.: 16/728,401

(22) Filed: Dec. 27, 2019

(65) Prior Publication Data

US 2021/0199201 A1 Jul. 1, 2021

(51) Int. Cl.
| | |
|---|---|
| *F16K 3/02* | (2006.01) |
| *F16K 3/30* | (2006.01) |
| *F16K 3/314* | (2006.01) |
| *E21B 34/00* | (2006.01) |
| *F16K 1/48* | (2006.01) |

(52) U.S. Cl.
CPC ............ *F16K 3/0254* (2013.01); *F16K 3/314* (2013.01); *E21B 34/00* (2013.01); *F16K 1/482* (2013.01)

(58) Field of Classification Search
CPC ........ F16K 3/0254; F16K 3/314; F16K 3/316; F16K 1/48; F16K 1/482; F16K 1/487; E21B 34/00
See application file for complete search history.

(56) References Cited

U.S. PATENT DOCUMENTS

| | | | | |
|---|---|---|---|---|
| 3,305,208 A | * | 2/1967 | Bredtschneider | F16K 1/482 251/327 |
| 3,662,778 A | * | 5/1972 | Leopold, Jr. | F16K 3/314 251/267 |
| 4,436,279 A | * | 3/1984 | Bonds | F16K 3/314 251/86 |
| 2014/0217320 A1 | * | 8/2014 | DeOcampo | F16K 3/0254 137/553 |
| 2016/0138721 A1 | * | 5/2016 | Burgess | F16K 31/12 251/14 |
| 2021/0025505 A1 | * | 1/2021 | Vijay | F16K 3/0236 |
| 2021/0172537 A1 | * | 6/2021 | Kim | F16K 3/0254 |

* cited by examiner

*Primary Examiner* — Kelsey E Cary
(74) *Attorney, Agent, or Firm* — Hogan Lovells US LLP (57) ABSTRACT

A system for converting operation of a valve between an unbalanced operation mode and a balanced operation mode includes a housing adapted to couple to a valve body. The system also includes a lower stem, including lugs, the lugs having a lug diameter that is larger than an adjacent lower stem diameter. The system further includes a valve member nut coupled to a valve member, the valve member nut having an opening to receive the lower stem, and pins extending into the opening, the pins forming a reduced diameter portion of the opening. In the system, the lower stem couples to the valve member, via the valve member nut, when the lugs are axially aligned with the reduced diameter portion and the lower stem decouples from the valve member when the lugs are axially misaligned with the reduced diameter portion.

20 Claims, 8 Drawing Sheets

SYSTEM AND METHOD FOR CONVERTIBLE BALANCED AND UNBALANCED STEM VALVE

BACKGROUND OF THE DISCLOSURE

1. Field of the Disclosure

The present disclosure relates in general to valve systems and more particularly to valve systems having dual operating modes.

2. Brief Description of Related Art

During downhole drilling and recovery operations, various tools may be tripped into and out of a wellbore to perform a number of different tasks. Wellbores may include wellbore assemblies at the surface that include one or more valves to regulate flow into and out of the wellbore. The valves may be exposed to high pressures, which need to be overcome in order to move the valves between an open position and a closed position. When stroking the valve, a valve member, such as a gate, is translated axially through a valve bore. To open the valve from the closed position, both the stem thrust and gate drag impact a total operating force to open the valve. Various valves may include balanced stems to reduce the stem thrust, thus reducing the operating forces and/or spring sizes utilized in actuators. However, balanced stem valves do not operate as surface safety valves that are set to close at a certain pressure. As a result, safety valves used at the well site may include large, expensive actuators to facilitate operation of the valve.

SUMMARY OF THE DISCLOSURE

Applicants recognized the problems noted above herein and conceived and developed embodiments of systems and methods, according to the present disclosure, for wellbore pressure isolation.

In an embodiment, a system for converting operation of a valve between an unbalanced operation mode and a balanced operation mode includes a housing adapted to couple to a valve body, the housing having a bore extending therethrough that communicatively couples to a valve chamber. The system also includes a lower stem extending through the bore, the lower stem having a variable outer diameter including lugs, the lugs having a lug diameter that is larger than an adjacent lower stem diameter. The system further includes a valve member nut coupled to a valve member, the valve member nut having an opening to receive the lower stem, and pins extending into the opening, the pins forming a reduced diameter portion of the opening. In the system, the lower stem couples to the valve member, via the valve member nut, when the lugs are axially aligned with the reduced diameter portion and the lower stem decouples from the valve member when the lugs are axially misaligned with the reduced diameter portion.

In another embodiment, a valve assembly includes a valve body, the valve body having a bore extending to a valve chamber. The valve assembly also includes a valve stem extending through the bore. The valve assembly further includes a valve member coupled to the valve stem, the valve member being movable between an open position and a closed position. The valve assembly also includes an actuator coupled to the valve stem, the actuator driving axial movement of the valve stem. The valve assembly further includes a housing coupled to a valve body opposite the actuator, the housing having a bore extending to the valve chamber. The valve assembly includes a lower stem extending through the bore, the lower stem having lugs proximate a tip, the lugs having a lug diameter that is larger than an adjacent lower stem diameter. The valve assembly further includes a valve member nut coupled to the valve member, the valve member nut having an opening to receive at least a portion of the lower stem, the valve member having a reduced diameter portion of the opening, wherein the lugs of the lower stem are arranged axially higher than and aligned with the reduced diameter portion when the valve assembly is configured in an balanced stem operation mode, and the lugs of the lower stem are misaligned with the reduced diameter portion when the valve assembly is configured in an unbalanced stem operation mode.

In an embodiment, a method for converting a valve assembly between a balanced stem operation mode and an unbalanced stem operation mode includes axially moving a lower stem, coupled to valve member nut of a valve member, in an upward direction, the movement transitioning lugs out of contact with a reduced diameter portion of the valve member nut. The method also includes rotating the lower stem. The method further includes aligning the lugs with a slot formed in the valve member nut.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Furthermore, like reference numbers may be used between figures to illustrate like components, but it should be appreciated that embodiments are not limited to utilizing like components.

Embodiments of the present disclosure describe systems and methods for converting a valve operation mode between a balanced stem operation and an unbalanced stem operation. Embodiments include an externally coupled system that may include a lower stem that engages a valve member without using internal threads to fasten the lower stem to the valve member, thereby generating a robust and easily convertible system. In various embodiments, a housing is externally fixed to a valve body and includes a lower stem that is axially translatable within an opening of the housing. The lower stem may engage a valve member stem and have axial movement blocked in at least one direction via alignment between valve stem lugs and anti-rotation pins of the valve member nut. The lower stem may include a receptacle to receive a tool that enables rotation of the lower stem, which may move the lugs out of alignment with the anti-rotational pins. As a result, the lower stem may be transitioned out of the valve member, thereby changing the operating condition of the valve from a balanced stem to an unbalanced stem. In embodiments, the valve stem and various components of the conversion system are accessible external to the valve, and as a result, operations may be performed while the valve is in service.

In various embodiments, a valve conversion system may be utilized in order to provide dual operations modes for a valve, such as between a balanced stem mode and an unbalanced stem mode. To overcome opening gate drag forces on a high pressure valve, such as a gate valve, a balanced lower stem may be included in order to reduce the amount of stem thrust on the gate when pressure is in the valve body. However, by adding a balanced lower stem, stem thrust forces needed to assist in closing the gate are removed. As a result, actuators utilized to assist with closing include larger return springs in order to make up the force lost by using the balanced lower stem. This increases costs of the actuator. Various embodiments include a manually attached valve conversion system with a lower stem that releasably attaches to a valve member, such as a gate. In various embodiments, components of the valve conversion system are external to the valve, enabling changes in operation while the valve is in service. For example, rotating mechanisms and the like may be accessible from an area external to the valve, which may be used to couple and decouple the lower stem from the valve member. Accordingly, the valve may be operable in two different modes in a robust, compact package. Providing the option to set the operating mode of the valve may reduce actuator costs because spring sizes may be reduced. In various embodiments, threads may not be utilized to couple the lower stem to the valve member, thereby further improving reliability of the system.

Figure 1:
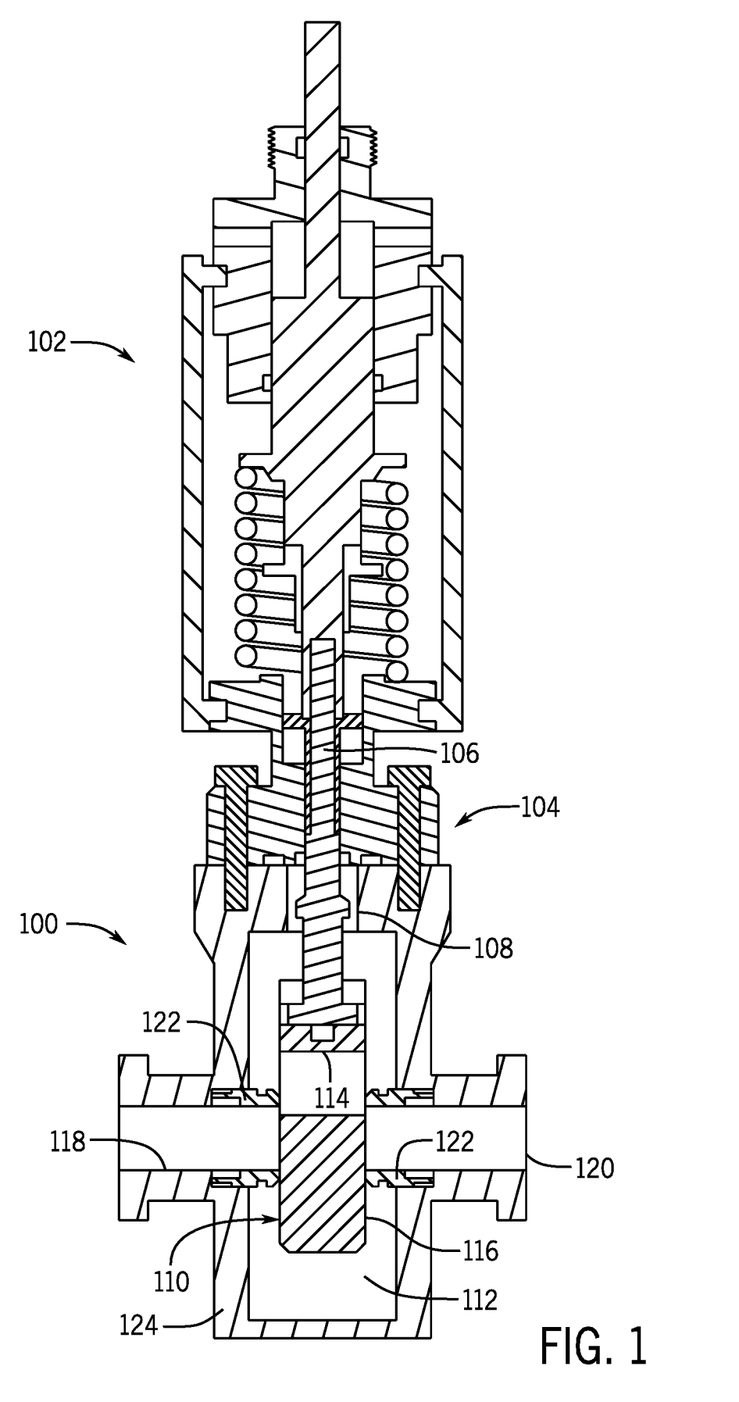
FIG. 1 is a cross-sectional side view of an embodiment of a valve assembly, in accordance with embodiments of the present disclosure.

FIG. 1 is a cross-sectional side elevation view of an embodiment of a valve 100 that includes an actuator 102 coupled to a bonnet 104. The illustrated actuator 102 is coupled to a valve stem 106 that extends through a central bore 108 and couples to a valve member 110 arranged within a chamber 112. The valve member 110 is a gate in the illustrated embodiment, but it should be appreciated that embodiments of the present disclosure may be utilized in other types of valves. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, the actuator 102, which may be manual, but is illustrated as automated (e.g., hydraulic, pneumatic, electric, etc.), drives movement of the valve member 110 between the open position and the closed position. When moving the valve member 110 from the closed position to the open position, the actuator overcomes an opposing force present in the valve 100 (e.g., the pressure of the fluid). This opening force may be referred to as a total operational force and includes components of both stem thrust and gate drag. Stem thrust refers to the linear force to seat and unseat the valve member. Gate drag refers to a lateral force applied by the fluid to the valve member. In various embodiments, each component may account for approximately one half of the opening force. Accordingly, reducing the stem thrust may reduce the opening and/or closing force by approximately one half, thereby enabling smaller actuators and/or manual actuators in place of automated actuators.

Embodiments of the present disclosure may include one or more components, which may be externally coupled to a valve body 124, in order to convert the valve 100 from an unbalanced stem valve to a balanced stem valve, and vice versa. That is, embodiments of the present disclosure include systems and methods to enable dual mode operation valves using external fasteners, which may reduce the use of internal fasteners (e.g., fasteners within the chamber 112). Furthermore, embodiments of the present disclosure may be directed toward a coupling system that facilitates joining the lower stem to the valve member utilizing external actions (e.g., actions outside the valve, actions that may be initiated from outside the valve), thereby enabling coupling and decoupling while the valve is in service.

Figure 2:
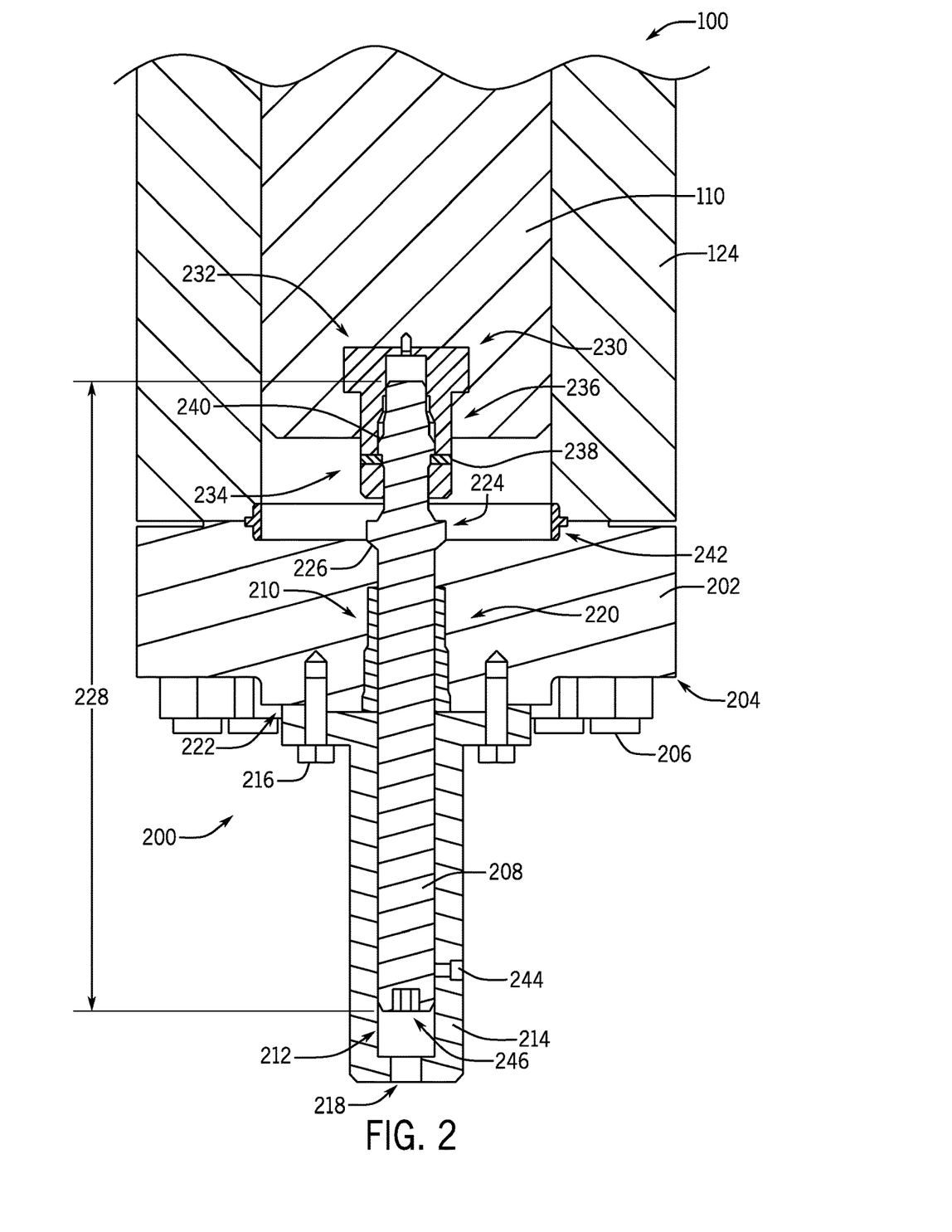
FIG. 2 is a cross-sectional side view of an embodiment of a valve conversion system, in accordance with embodiments of the present disclosure.

FIG. 2 is a partial cross-sectional side view of an embodiment of the valve 100 including a valve conversion system 200 coupled to the valve body 124. It should be appreciated that various components of the valve 100 have been removed for clarity with the following discussion. Furthermore, like reference characters may be carried through to represent like components in figures, however, this notation is for convenience and clarity and is not intended to limit the scope of the present disclosure. In various embodiments, the valve conversion system 200 includes a housing 202 that may facilitate coupling of the system 200 to the valve body 124. For example, in the illustrated embodiment, the housing 202 includes apertures 204 that receive fasteners 206 to join the housing 202 to the valve body 124. The illustrated fasteners 206 are bolts, however, it should be appreciated that a variety of different fasteners may also be utilized. Moreover, in embodiments, the housing 202 may be threaded to the valve body 124, clamped to the valve body 124, or otherwise coupled to the valve body 124, and as a result, the fasteners 206 are shown for illustrative purposes only.

In the illustrated embodiment, a lower stem 208 extends through an opening 210 (e.g., bore, passage) formed in the housing 202 and through an aligned opening 212 (e.g., bore, passage) formed in a housing extension 214. The illustrated openings 210, 212 may be similar to the central bore 108 from FIG. 1, in that various packing and movement limiting features may be included. The illustrated housing extension 214 is coupled to the housing 202 via fasteners 216, but it should be appreciated that the housing extension 214 may be otherwise coupled to the housing 202, for example via threads or the like. The housing extension 214 includes an access port 218 that is communicatively coupled to the opening 212 (e.g., that connects to the opening 212, that provides access to the opening 212). As will be described below, the access port 218 may facilitate engagement with the lower stem 208, for example, via a tool that extends into the opening 212 and couples to the lower stem 208. It should be appreciated that the access port 218 may include a closure device, such as a plug or the like, which is not illustrated for clarity. In various embodiments, the plug or cover of the access port 218 may be secured from interference or access to unauthorized personnel using a variety of methods, such as locks.

As illustrated, packing components 220 are arranged proximate the interface 222 between the housing 202 and the housing extension 214, as well as along the opening 210. The packing components 220 may block fluid from exiting the chamber 112. It should be appreciated that the packing components 220 are for illustrative purposes only and that a variety of different materials may also be utilized in order to block flow from the chamber 112 through the access port 218. Because the valve conversion system 200 is coupled to the valve body 124 and remains coupled during operation, the packing components 220 may be rated to accommodate expected operating conditions of the valve 100.

Returning to the lower stem 208, the lower stem 208 has a variable outer diameter including a backstop 224, with an increased outer diameter, that engages a valve stem seat 226 of the housing 202. In the illustrated embodiment, the backstop 224 blocks axial movement of the lower stem 208 in at least one direction (e.g., a downward direction with respect to the illustrated embodiment, a downward direction toward the access port 218). In various embodiments, a lower stem length 228, or portions thereof, may be particularly selected such that the backstop 224 is positioned at a location that does not affect travel of the valve member 110. That is, the lower stem length 228 will enable normal operation of the valve member 110 (e.g., movement between the open position and the closed position) in cases where the lower stem 208 is both coupled to the valve member 110 and decoupled from the valve member 110. In other words, the valve member 110 may continue to operate within the same range regardless of whether the valve is in a balanced stem mode or an unbalanced stem mode.

The lower stem 208 couples to the valve member 110 via a valve member nut 230 (e.g., nut). The illustrated valve member nut is a T-shaped nut and includes a first portion 232 embedded within the valve member 110 and a second portion 234 extending outward from the valve member 110. It should be appreciated that both the first and second portions 232, 234 may be within the volume of the valve member 110 in other embodiments. As will be described in more detail below, the valve member nut 230 includes an opening 236 (e.g., passage, bore) that receives a portion of the low stem 208. The nut 230 further includes anti-rotation pins 238 extending into the opening 236. It should be appreciated that anti-rotation pins are utilized in the illustrated embodiment, but are not intended to be limiting. As described below, the anti-rotation pins block axial movement of the lower stem 208 due to an alignment between a component of the lower stem 208 and the anti-rotation pins 238. However, it should be appreciated that other components, such as a shoulder or a reduced diameter portion, may be utilized in place of the anti-rotation pins 238. Accordingly, the anti-rotation pins 238 are representative of one or more features that create a reduced diameter portion within the opening 236. In various embodiments, the lower stem 208 may include lugs 240 that block disengagement of the lower stem 208 from the nut 230, due to contact with the anti-rotation pins 238. In other words, an outer diameter of the lugs 240 may be greater than an inner radial extent of the anti-rotation pins 238, and as a result, movement of the valve stem 208 is blocked in the downward direction (e.g., toward the access port 218).

In the embodiment illustrated in FIG. 2, the housing 202 is coupled to the valve body 124 such that the chamber 112 receives the lower stem 208. In other words, the lower stem 208 extends into the chamber 112. In various embodiments, the housing 202 may increase a size of the chamber 112, for example, by including a recessed portion 242. However, it should be appreciated that the increased size of the chamber 112 may be to accommodate the lost volume due to the presence of the lower stem 208, and as a result, an overall volume may not change. However, in embodiments, the overall volume may change. Additionally, dimensions of the chamber 112 and recessed portion 242 may be particularly selected to receive debris that may collect within the chamber 112, for example, abrasive particles that are present in the fluid.

In certain embodiments, additional components may also be utilized in order to block or restrict movement of the lower stem 208. For example, the housing extension 214 may receive a lock screw 244 to block rotation of the lower stem 208. It should be appreciated that the lock screw 244 is described for illustrative purposes only and in other embodiments different mechanisms may be utilized to block rotation of the lower stem 208. For example, the lower stem 208 may include a slot or groove that receives the lock screw 244 and blocks rotation, however, removal or adjustment of a position of the lower stem 208 may enable rotation of the lower stem 208. In certain embodiments, the lock screw 244 may block movement of the lower stem 208 in one movement plane (e.g., rotationally), but enable movement in another movement plane (e.g., axially). For example, the lock screw 244 may extend into the slot or groove, which may be extended, such that axial movement is enabled. In various embodiments, the axial movement may be restricted by a size of the slot or groove.

As noted, in various embodiments the lower stem 208 may be rotated, for example manually rotated, in order to facilitate coupling to and decoupling from the valve member 110. For example, rotation of the lower stem 208 may change an alignment between the lugs 240 and the anti-rotation pins 238 such that the lugs 240 pass through a slot or opening in the nut 230. In the illustrated embodiment, the lower stem 208 includes a receptacle 246 for receiving a tool, such as a hex-head driver or the like, to rotate the lower stem 208. In various embodiments, a manual tool is utilized, such as an operator inserting the tool through the access port 218. It should be appreciated that other methods may be deployed for rotating the lower stem 208, such as an electric actuator or the like.

Figure 3:
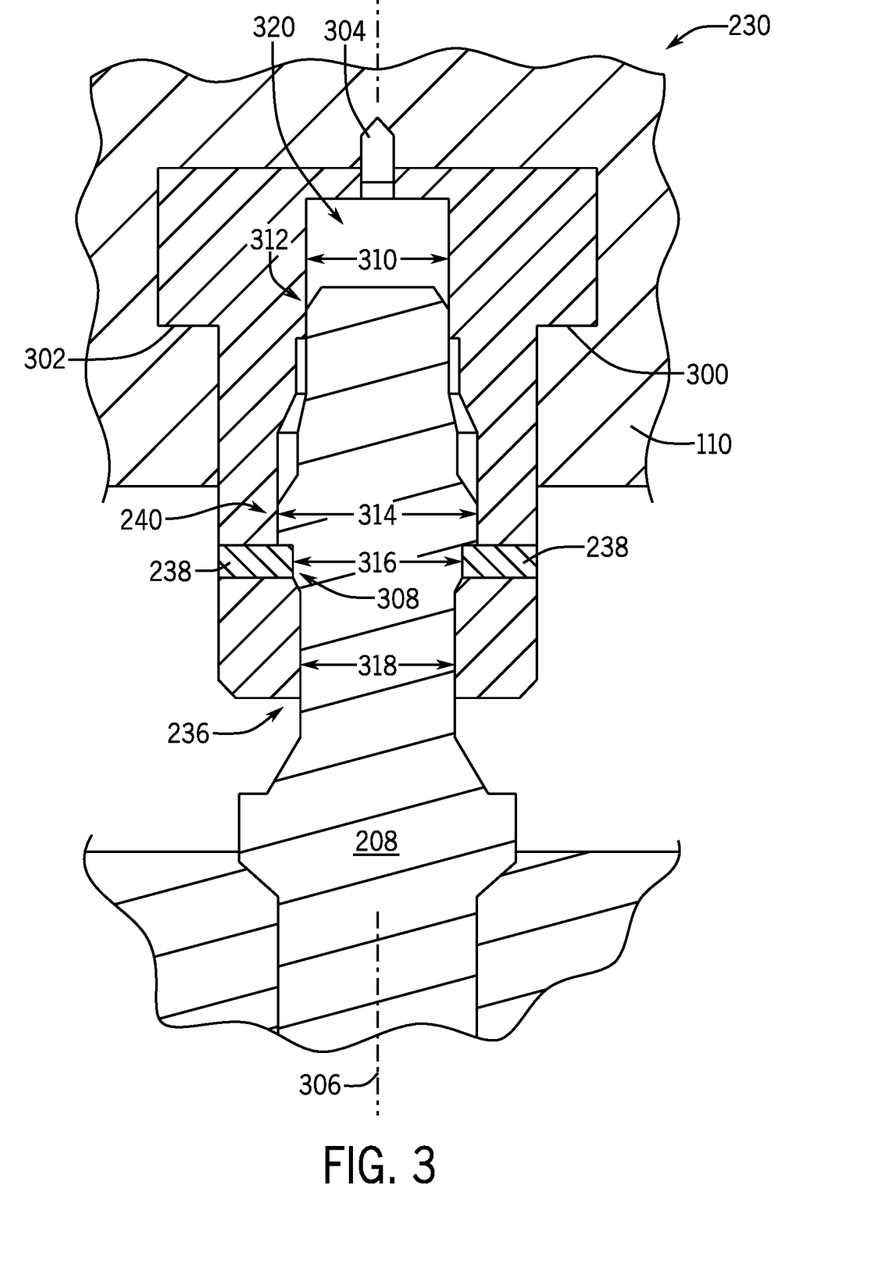
FIG. 3 is a cross-sectional side view of an embodiment of a valve member nut and lower valve stem, in accordance with embodiments of the present disclosure.

FIG. 3 is a cross-sectional side view of an embodiment of the valve member nut 230 having the lower stem 208 arranged within the opening 236. As noted, the valve member nut 230 is generally T-shaped, such that shoulders 300 of the nut 230 contact platforms 302 of the valve member 110, thereby blocking axial movement of the nut 230. The illustrated nut 230 also includes a fastener 304 to further secure the nut 230 to the valve member 230. It should be appreciated that the fastener 304 may be omitted in various embodiments, for example, the nut 230 may be threaded into the valve member 110 or otherwise coupled to the valve member 110. Additionally, while not illustrated in FIG. 3, in embodiments a flow path may be formed between the opening 236 and the passage 114 and/or chamber 112 to facilitate removal of trapped fluids within the opening 236.

As described above, in various embodiments anti-rotation pins 238 extend into the opening 236 to block rotation of the lower stem 208 about an axis 306. In various embodiments, the lower stem 208 includes a gap or recess 308 that extends circumferentially about a portion of the diameter of the lower stem 208. As a result, rotation beyond a predetermined range may be blocked by the anti-rotation pins 238. As will be described below, the lower stem 208 may be driven in an upward direction (e.g., toward the actuator 102, toward the fastener 304) such that the anti-rotation pins 238 are moved out of the gap 308, thereby facilitating rotation of the lower stem 208 to enable the lower stem 208 to decouple from the valve member 110.

In various embodiments, the lower stem 208 has a variable diameter over its length 228, or at least a portion of the length 228. For example, the lower stem 208 may include a first diameter 310 at a tip 312, a second diameter 314 at the lugs 240, a third diameter 316 at the gap 308, and a fourth diameter 318 axially below the gap 308, among other potential diameter portions. In the illustrated embodiment, the second diameter 314 is the larger than the first, third, and fourth diameters 310, 316, 318. As noted above, the lugs 240 extend outwardly from the axis 306 and may block axial movement of the lower stem 308. In the illustrated embodiment, the opening 236 also includes variable diameter portions in order to accommodate the lower stem 208 (e.g., the region proximate the tip 312 has a diameter less than the region proximate the lugs 240). In embodiments, the associated variable diameter portions may be larger than the portion of the lower stem 208 aligned with the area.

In operation, the lower stem 208 may be axially translatable within the opening 236. That is, the lower stem 208 may move along the axis 306, in certain conditions. For example, a variable diameter portion of either the lower stem 308 and/or the opening 236 may block or restrict movement beyond a certain position. To facilitate the movement, a space 320 is provided within the opening 236 that, when the lower stem 208 is coupled to the nut 230, is free to receive and accommodate movement of the lower stem 208. For example, in the illustrated embodiment, the lower stem 208 may move axially along the axis 306 in an upward direction (e.g., toward the fastener 304) and into the space 320. As will be described below, such movement may transition the anti-rotation pins 238 out of the gap 308, thereby enabling rotation of the lower stem 208. This rotation may translate the lugs 240 into a slot (not shown) that enables the lower stem 208 to move in a downward direction (e.g., away from the fastener 304) and out of the opening 236. It should be appreciated that, in certain embodiments, the slot may be represented by the area between the ends of the anti-rotation pins 238.

Figure 4:
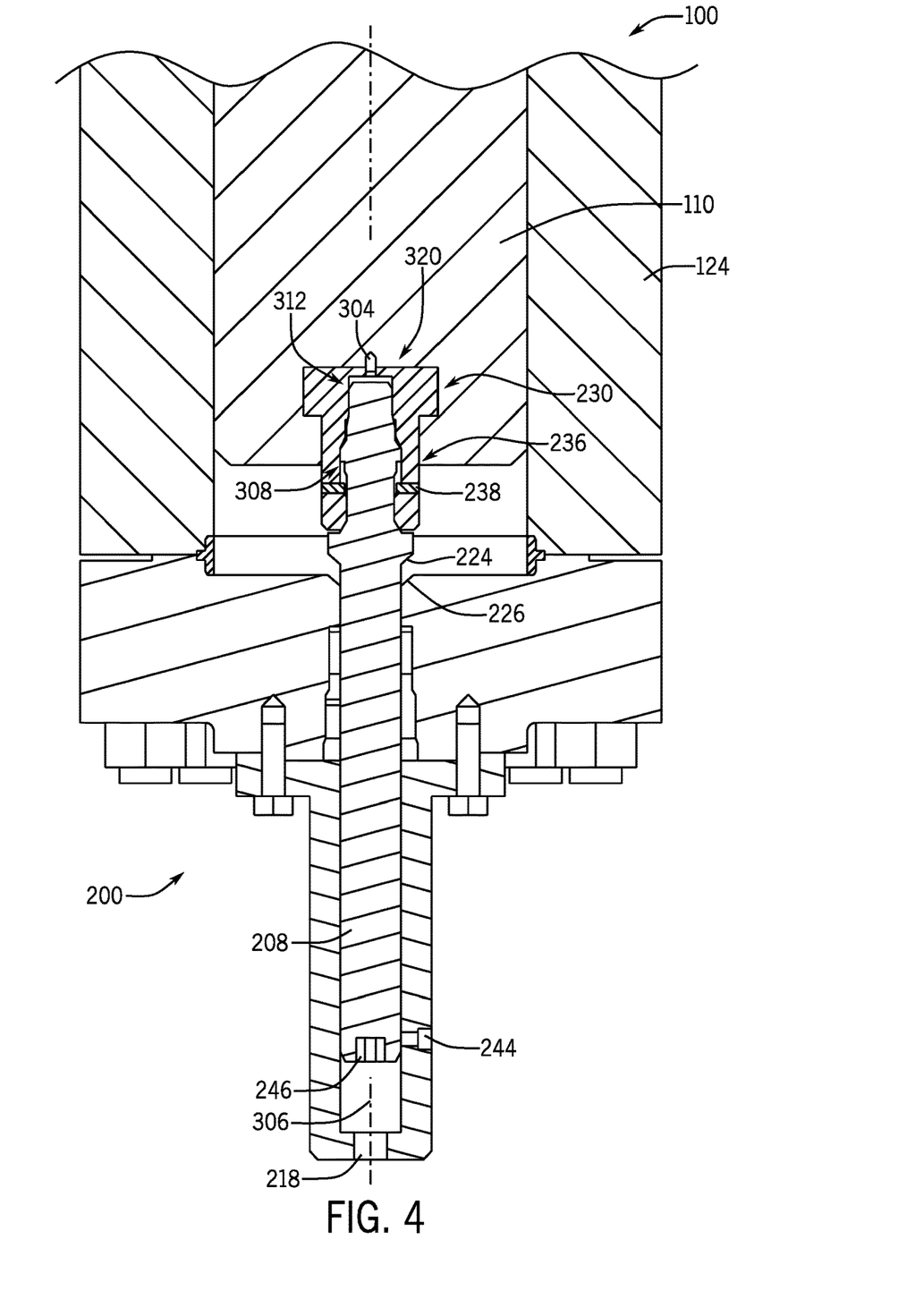
FIG. 4 is a cross-sectional side view of an embodiment of a valve conversion system, in accordance with embodiments of the present disclosure.

FIG. 4 is a cross-sectional view of an embodiment of the valve 100 including the valve conversion system 200. In the illustrated embodiment, the lower stem 208 is coupled to the nut 230, however, the lower stem 208 has been transitioned in an upward direction (e.g., toward the actuator 102, toward the fastener 304), as illustrated by the relative position of the lower stem end to the lock screw 244, as compared to the view in FIG. 2. Moreover, in the illustrated embodiment, the backstop 224 has translated off the valve stem seat 226. As a result, the tip 312 of the lower stem 208 transitions into the space 320, and as a result, the anti-rotation pins 238 are translated out of the gap 308, thereby enabling rotation of the lower stem 208.

In operation, an operator may utilize a tool to engage the receptacle 246 via the access port 218 and rotate the lower stem 208 about the axis 306. In embodiments, the rotation may be 90 degrees. However, it should be appreciated that other rotational ranges may also be utilized. In various embodiments, one or more stops (not pictured) are arranged within either the opening 236 and/or coupled to the lower stem 208 in order to restrict rotation. In other words, rotation may be limited by features that block further rotation. As a result, the lower stem 208 may not freely spin. It will be appreciated that, in other embodiments, the lower stem 208 may freely spin. Moreover, the low stem 208 may include markings to provide a visual indication to the operator regarding the position of the lugs 240. In various embodiments, the lugs 240 are translated into a slot (not shown) formed in the opening 236 after being rotated, which enables downward movement of the lower stem 208.

Figure 5:
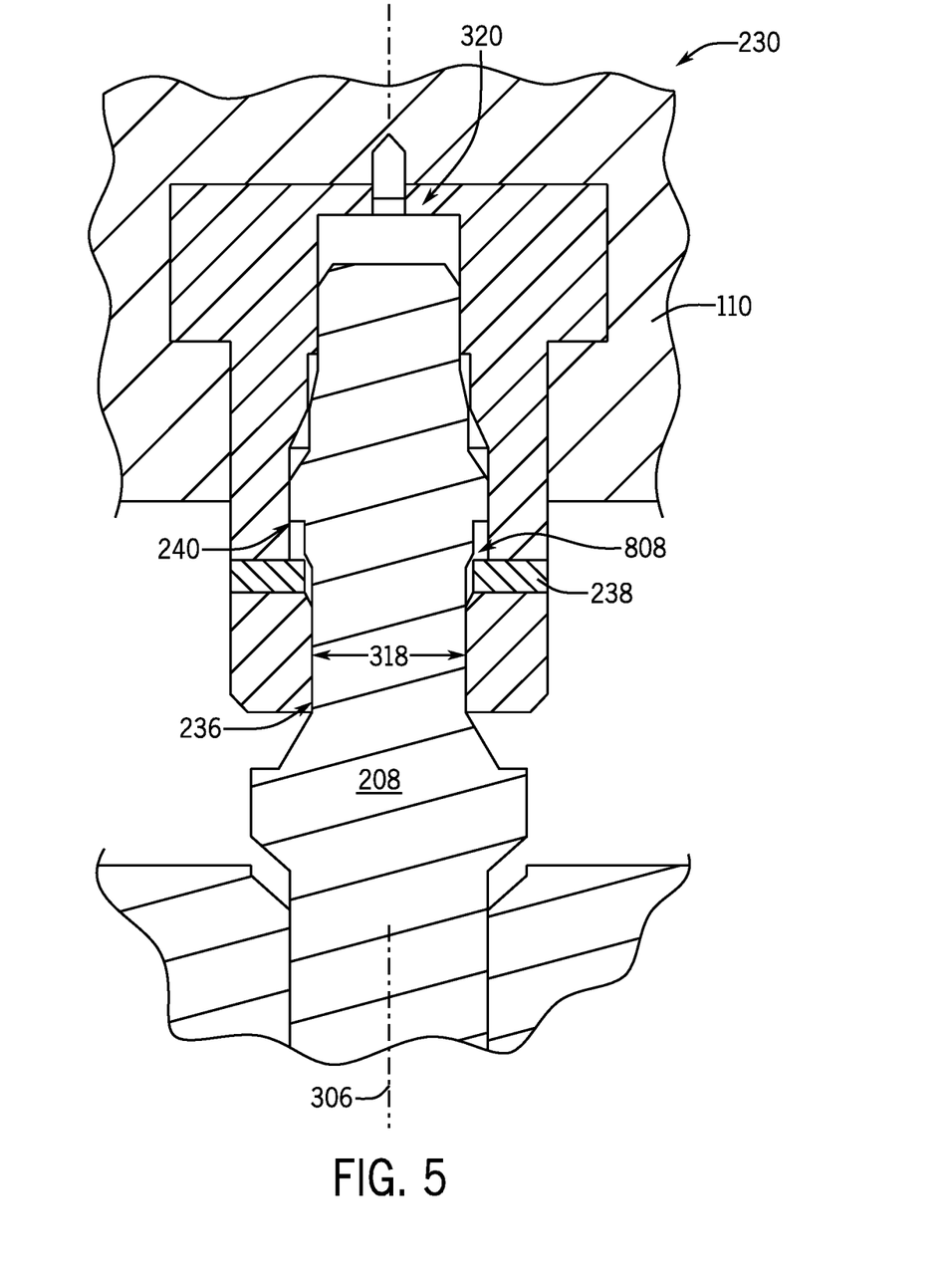
FIG. 5 is a cross-sectional side view of an embodiment of a valve member nut and lower valve stem, in accordance with embodiments of the present disclosure.

FIG. 5 is a cross-sectional side view of an embodiment of the valve member nut 230 having the lower stem 208 arranged within the opening 236 after the lower stem 208 has transitioned into the space 320. In various embodiments, once pressure is removed from the system, the lower stem 208 may be moved into the space 320, in contrast to when pressure is in the system, where the pressure may drive the backstop 224 toward the valve stem seat 226. For example, a length of the space 320 is less than a length of the space 320 in FIG. 3. This may be further illustrated by the axially adjusted position of other components of the lower stem 208, such as the lugs 240.

In the illustrated embodiment, the anti-rotation pins 238 are out of the gap 308 and aligned with the portion of the lower stem 208 having the third fourth diameter 318, and as a result, rotation is enable about the axis 306. As will be described below, the lower stem 208 may be engaged via a tool and rotated to transition the lugs 240 out of alignment with the anti-rotation pins 238, for example, within a slot or the like.

Figure 6:
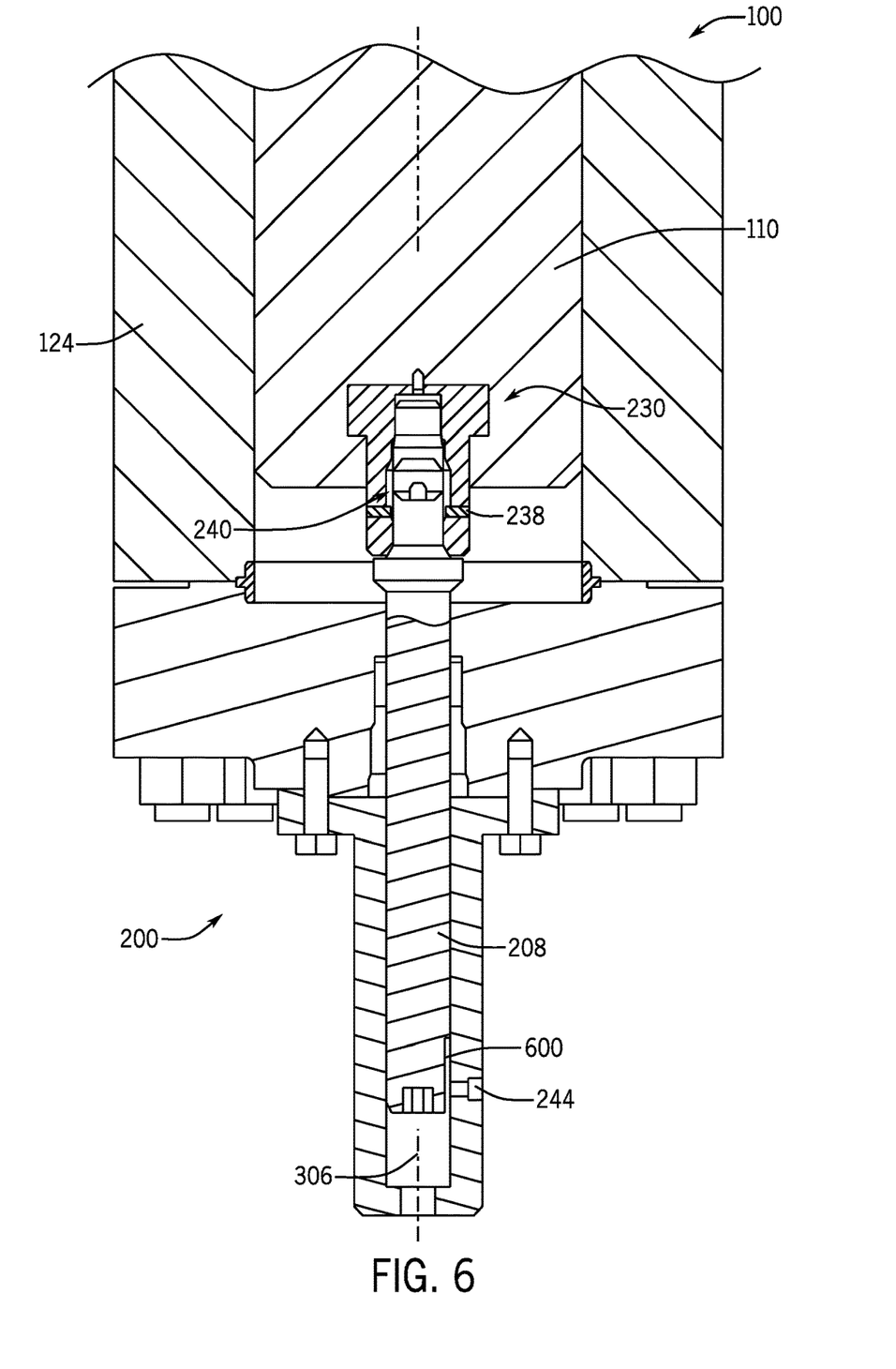
FIG. 6 is a cross-sectional side view of an embodiment of a valve conversion system, in accordance with embodiments of the present disclosure.

FIG. 6 is a cross-sectional side view of an embodiment of the valve conversion system 200 in which the lower stem 208 has been rotated about the axis 306. In the illustrated embodiment, the lower stem 208 is rotated approximately 90 degrees about the axis 306, thereby transitioning the lugs 240 out of alignment with the anti-rotation pins 238. In other words, axial movement of the lower stem 208 in a downward direction is enabled. In various embodiments, the lugs 240 may be aligned with a slot or groove in the nut 230, which is not illustrated in the illustrated embodiment. Further illustrated is the lock screw 244 engaging the lower stem 208, for example, within a groove 600 formed in the lower stem 208. In various embodiments, the lock screw 244 may block further rotation of the lower stem 208. However, in various embodiments, the lock screw 244 may enable rotation by a predetermined amount (e.g., until contacting a side of the groove 600). Furthermore, as noted above, the groove 600 has a limited axial length that restricts or otherwise controls, as least in part, axial travel of the lower stem 208.

Figure 7:
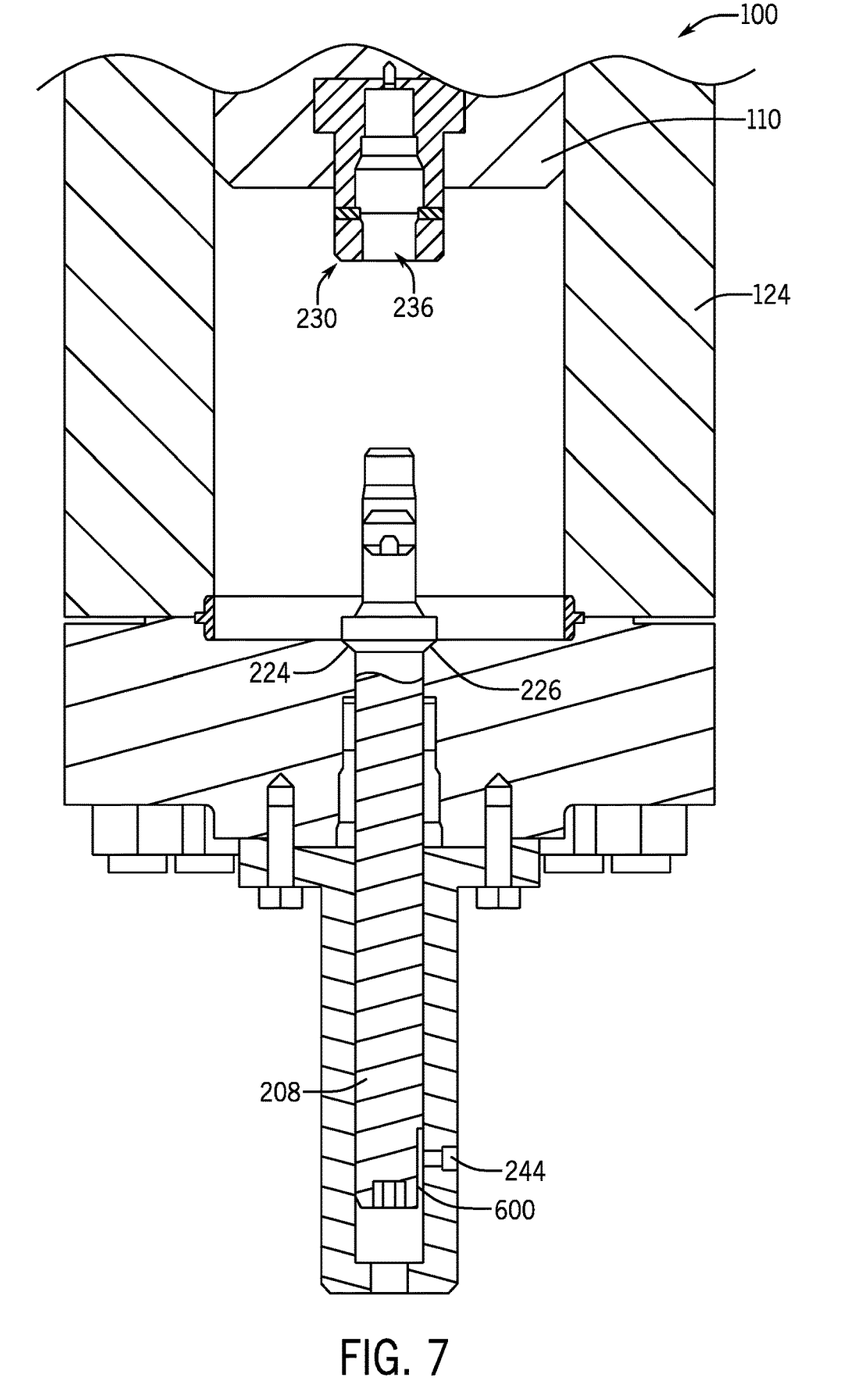
FIG. 7 is a cross-sectional side view of an embodiment of a valve conversion system, in accordance with embodiments of the present disclosure.

FIG. 7 is a cross-sectional side view of an embodiment of the valve conversion system 200 in which the lower stem 208 is disengaged from the valve member nut 230, thereby converting the valve to an unbalanced stem valve. In the illustrated embodiment, the backstop 224 has transitioned toward the valve stem seat 226. In the illustrated embodiment, the lock screw 244 slides along the groove 600 as the lower stem 208 moves downward, however, it should be appreciated that in other embodiments the lock screw 244 may be removed to facilitate the axial movement of the lower stem 208.

As illustrated, the lower stem 208 is maintained in the position of FIG. 6 (e.g., the lugs 240 are not aligned with the anti-rotation pins 238), thereby facilitating opening and closing of the valve without interference. That is, as the valve is stroked, the lower stem 208 may enter and leave the opening 236 without interfering with operation of the valve. Additionally, if it is desired to convert the valve back into a balanced stem valve, the lower stem 208 is positioned to quickly re-engage the nut 230. In this manner, the valve may be configured to work in two different operating modes.

Figure 8:
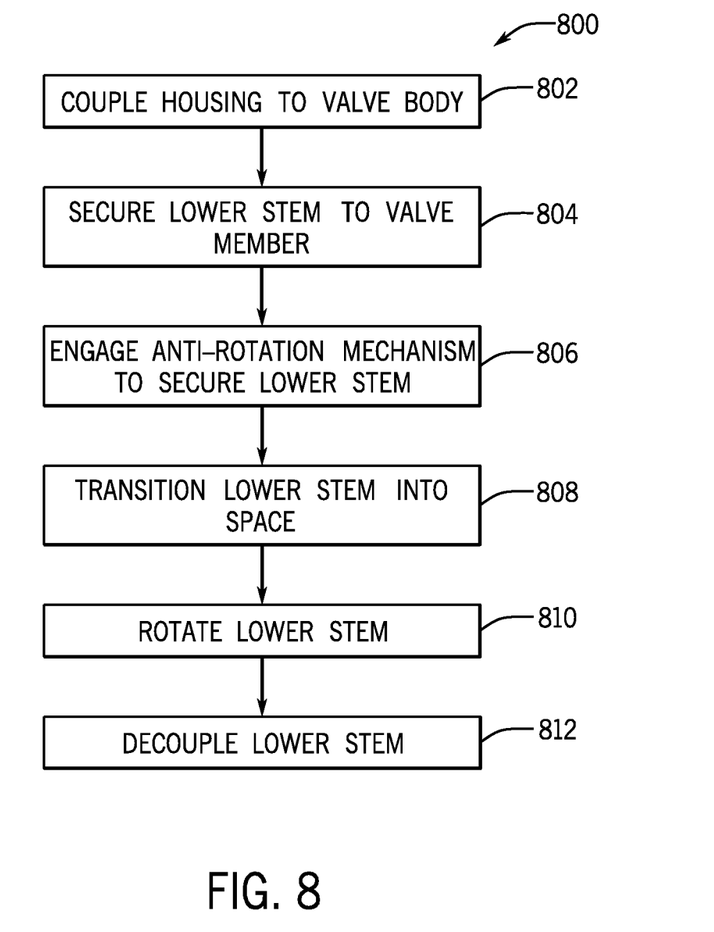
FIG. 8 is a flow chart of an embodiment of a method for using a valve conversion system, in accordance with embodiments of the present disclosure.

FIG. 8 is a flow chart of an embodiment of a method 800 for utilizing a valve conversion system with a valve. It should be appreciated that the method may include additional or fewer steps. Moreover, the steps may be performed in a different order, or in parallel, unless specifically indicated otherwise. The illustrated embodiment begins with coupling a housing to a valve body 802. The housing may include a lower valve stem for engaging a valve member. In various embodiments, the housing is secured to the valve body via fasteners or the like. In various embodiments, the fasteners and coupling mechanism are external of the valve. The method continues by securing the lower stem to the valve member 804. As described above, various embodiments include a valve member nut that receives the lower stem. In embodiments, the lower stem is not threadingly secured to the valve member nut, but rather, rotation of the lower stem to align lugs with anti-rotation pins may facilitate engagement between the valve member nut and the lower stem. In embodiments, rotation of the lower stem or other coupling techniques are performed external to the valve (e.g., may be performed while the valve is in operation). In other words, tools or the like may access at least a portion of the lower stem in order to secure the lower stem to the valve member nut.

In various embodiments, an anti-rotation mechanism secures the lower stem 806. By way of example only, the anti-rotation mechanism may be a lock screw that engages a portion of the lower stem to block rotational movement of the lower stem. In embodiments, the lock screw is arranged within a groove to enable axial movement of the lower stem while still blocking rotational movement. It should be appreciated that, in various embodiments, the lock screw or other anti-rotation mechanism is engaged and disengaged external to the valve. In other words, the lock screw may be engaged and/or disengaged while the valve is operational.

Embodiments of the present disclosure further include transitioning the lower stem into a space within the valve member nut 808. For example, once pressure within a valve chamber is reduced, the lower stem may move upward and into the space. In various embodiments, the movement of the lower stem may be facilitated by an external force applied to the lower stem, for example, via a tool that engages a receptacle formed in the lower stem. The lower stem may be rotated 810. Rotation of the lower stem may be limited to a certain range, for example between 0 and 90 degrees, and misaligns lugs of the lower stem with anti-rotational pins of the valve member nut. As a result, the lower stem may pass through a chamber or slot within the valve member nut to decouple the lower stem from the valve member 812. In this manner, a valve may be converted between balanced stem operation and unbalanced stem operation. For example, the valve member may translate axially with the lower stem entering and exiting the valve member nut, but due to the misalignment of the lugs and the anti-rotation pins, the lower stem does not interfere with the operation of the valve.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A system for converting operation of a valve between an unbalanced operation mode and a balanced operation mode, comprising:
   a housing adapted to couple to a valve body, the housing having a bore extending therethrough that communicatively couples to a valve chamber;
   a lower stem extending through the bore, the lower stem having a variable outer diameter including lugs, the lugs having a lug diameter that is larger than an adjacent lower stem diameter; and
   a valve member nut coupled to a valve member, the valve member nut having an opening to receive the lower stem, and pins extending into the opening, the pins forming a reduced diameter portion of the opening;
   wherein the lower stem couples to the valve member, via the valve member nut, when the lugs are axially aligned with the reduced diameter portion and the lower stem decouples from the valve member when the lugs are axially misaligned with the reduced diameter portion.

2. The system of claim 1, further comprising:
   a housing extension coupled to the housing, the housing extension having an extension bore that aligns with the bore of the housing, the lower stem extending through the extension bore; and
   a locking member extending through an opening of the housing extension, the locking member engaging the lower stem to block rotational movement of the lower stem.

3. The system of claim 1, wherein the lower stem further comprises a lower receptacle for receiving a tool, the tool driving at least one of axial movement or rotational movement of the lower stem, the receptacle being accessible from a location external to the valve body.

4. The system of claim 1, wherein the lower stem further comprises a backstop, the backstop adapted to engage a valve stem seat formed in the housing, the valve stem seat restricting axial movement of the lower stem in at least one direction.

5. The system of claim 1, further comprising:
a slot formed in the valve member nut, the slot having a larger diameter than the reduced diameter portion, wherein the lugs are configured to pass through the slot when the slot and the lugs are aligned.

6. The system of claim 1, wherein the lower stem is configured to move between a first position where the lugs are aligned with the reduced diameter portion and a second position where the lugs are misaligned with the reduced diameter portion via a 90-degree rotation of the lower stem about a longitudinal axis of the stem.

7. The system of claim 1, further comprising:
a flow path coupling the opening to at least one of a flow path of the valve member or a valve chamber.

8. A valve assembly, comprising:
a valve body, the valve body having a bore extending to a valve chamber;
a valve stem extending through the bore;
a valve member coupled to the valve stem, the valve member being movable between an open position and a closed position;
an actuator coupled to the valve stem, the actuator driving axial movement of the valve stem;
a housing coupled to a valve body opposite the actuator, the housing having a bore extending to the valve chamber;
a lower stem extending through the bore, the lower stem having lugs proximate a tip, the lugs having a lug diameter that is larger than an adjacent lower stem diameter; and
a valve member nut coupled to the valve member, the valve member nut having an opening to receive at least a portion of the lower stem, the valve member having a reduced diameter portion of the opening, wherein the lugs of the lower stem are arranged axially higher than and aligned with the reduced diameter portion when the valve assembly is configured in an balanced stem operation mode, and the lugs of the lower stem are misaligned with the reduced diameter portion when the valve assembly is configured in an unbalanced stem operation mode.

9. The valve assembly of claim 8, further comprising:
a housing extension coupled to the housing, the housing extension having an extension bore that aligns with the bore of the housing, the lower stem extending through the extension bore; and
a locking member extending through an opening of the housing extension, the locking member engaging the lower stem to block rotational movement of the lower stem.

10. The valve assembly of claim 9, wherein the housing extension includes an access port, the access port forming an opening to engage the lower stem from a location external from the housing extension.

11. The valve assembly of claim 10, wherein the lower stem further comprises a lower receptacle for receiving a tool, the tool driving at least one of axial movement or rotational movement of the lower stem, the receptacle being accessible via the access port.

12. The valve assembly of claim 8, further comprising:
a slot formed in the valve member nut, the slot having a larger diameter than the reduced diameter portion, wherein the lugs are configured to pass through the slot when the slot and the lugs are aligned.

13. The valve assembly of claim 8, wherein the lower stem is rotatable about an axis, the rotation being limited by at least one of a groove formed proximate the lugs or a locking member engaging the lower stem.

14. The valve assembly of claim 13, wherein the lower stem is configured to rotate between a first position and a second position, the second position being 90 degrees from the first position.

15. The valve assembly of claim 8, wherein the reduced diameter portion is formed by anti-rotation pins extending into the opening.

16. The valve assembly of claim 8, wherein an axial travel of the valve member remains constant between the balanced stem operation mode and the unbalanced stem operation mode.

17. A method for converting a valve assembly between a balanced stem operation mode and an unbalanced stem operation mode, comprising:
axially moving a lower stem, coupled to valve member nut of a valve member, in an upward direction, the movement transitioning lugs out of contact with a reduced diameter portion of the valve member nut;
rotating the lower stem; and
aligning the lugs with a slot formed in the valve member nut.

18. The method of claim 17, further comprising:
securing the lower stem via a locking member, the locking member blocking rotation of the lower stem.

19. The method of claim 17, wherein rotating the lower stem comprises rotating stem approximately 90 degrees, and further comprising:
engaging a receptacle, formed in the lower stem, from a location external to a valve body.

20. The method of claim 17, wherein an axial travel of the valve member remains constant between the balanced stem operation mode and the unbalanced stem operation mode.

* * * * *